United States Patent

Schmidt et al.

(10) Patent No.: US 6,579,355 B1
(45) Date of Patent: Jun. 17, 2003

(54) INTERFERENCE PIGMENTS

(75) Inventors: Christoph Schmidt, Krefeld (DE); Klaus Bernhardt, Gross-Umstadt (DE); Dieter Heinz, Heppenheim (DE)

(73) Assignee: Merck Patent Gesellschaft mit Beschraenkter Haftung, Darmstadt (DE)

( * ) Notice: Subject to any disclaimer, the term of this patent is extended or adjusted under 35 U.S.C. 154(b) by 0 days.

(21) Appl. No.: 09/503,730

(22) Filed: Feb. 15, 2000

(30) Foreign Application Priority Data

Feb. 15, 1999 (DE) .......................... 199 15 153

(51) Int. Cl.$^7$ .................. C04B 14/20; C04B 14/00; C09C 1/04; C09C 1/36
(52) U.S. Cl. .................. 106/415; 106/417; 106/418; 106/430; 106/436
(58) Field of Search .................. 106/415, 417, 106/418, 430, 436

(56) References Cited

U.S. PATENT DOCUMENTS

| | | | | |
|---|---|---|---|---|
| 3,087,828 A | | 4/1963 | Linton | |
| 4,509,988 A | * | 4/1985 | Bernhard | 106/308 R |
| 4,744,832 A | * | 5/1988 | Franz et al. | 106/309 |
| 5,009,711 A | * | 4/1991 | Emmert et al. | 106/415 |
| 5,223,360 A | * | 6/1993 | Prengel et al. | 430/39 |
| 5,273,576 A | * | 12/1993 | Sullivan et al. | 106/418 |
| 5,302,199 A | * | 4/1994 | Prengel et al. | 106/417 |
| 5,344,488 A | * | 9/1994 | Reynders et al. | 106/425 |
| 5,501,731 A | * | 3/1996 | Schmid et al. | 106/417 |
| 5,540,769 A | * | 7/1996 | Franz et al. | 106/415 |
| 5,753,026 A | * | 5/1998 | Kuntz et al. | 106/450 |
| 5,770,310 A | * | 6/1998 | Noguchi et al. | 428/403 |
| 5,951,750 A | * | 9/1999 | Zimmermann et al. | 106/417 |
| 6,019,831 A | * | 2/2000 | Schmidt et al. | 106/417 |
| 6,063,179 A | * | 5/2000 | Schmid et al. | 106/415 |
| 6,238,472 B1 | * | 5/2001 | Andes et al. | 106/430 |
| 6,361,593 B2 | * | 3/2002 | DeLuca, Jr. et al. | 106/417 |

FOREIGN PATENT DOCUMENTS

DE WO-93-08237 * 4/1993 ............. C09C/1/00

* cited by examiner

Primary Examiner—Mark L. Bell
Assistant Examiner—Patricia L. Hailey
(74) Attorney, Agent, or Firm—Millen White Zelano & Branigan

(57) ABSTRACT

The present invention relates to an interference pigment based on multiply-coated platelet-shaped substrates, comprising at least one layer sequence of (A) a high refractive index coating comprising a mixture of $TiO_2$ and $Fe_2O_3$ in a ratio of about 10:1 to about 3:1 and optionally one or more metal oxides in amounts of $\leq$ about 20% by weight based on the layer (A), (B) a colorless coating having a refractive index n $\leq$ about 1.8, and optionally (C) an outer protective layer.

19 Claims, No Drawings

INTERFERENCE PIGMENTS

FIELD OF THE INVENTION

The present invention relates to interference pigments, preferably strong interference pigments, based on multiply-coated platelet-shaped substrates.

BACKGROUND OF THE INVENTION

Luster or effect pigments are widely used in industry, especially in automotive coatings, decorative coating, plastic, paints, printing inks and cosmetic formulations.

Luster pigments with an angle-dependent color change between a number of interference colors exhibit a color interplay which makes them particularly useful for automotive coatings and anti-counterfeit applications. Pigments of this type which are based on multiply-coated platelet-shaped substrates are known for example from U.S. Pat. No. 4,434, 010, JP H7-759, U.S. Pat. No. 3,438,796, U.S. Pat. No. 5,135,812, DE 44 05 494, DE 44 37 753, DE 195 16 181 and DE 195 15 988.

WO 93/12182 discloses luster pigments based on transparent platelet-shaped substrates without a harsh metallic luster. Mica platelets are coated with a high refractive index metal oxide layer, for example $TiO_2$ and a non-selectively absorbing layer. These pigments have in plan view a certain interference color which depends on the $TiO_2$ layer thickness and which increasingly weakens with increasing skewness of viewing angle and finally flops off into grey or black. The interference color does not change, but there is a noticeable decrease in the saturation.

JP 1992/93206 teaches luster pigments based on glass platelets or mica platelets coated with an opaque metal layer and alternating $SiO_2$ and $TiO_2$ layers.

EP 0 753 545 A2 discloses goniochromatic luster pigments based on multiply-coated, high refractive index, nonmetallic, platelet-shaped substrates which are at least partially transparent to visible light, comprising at least one layer packet of a colorless coating having a low refractive index and a reflecting, selectively or non-selectively absorbing coating. The production process described in EP 0 753 545 A2 involves coating the pigment substrate via chemical vapour deposition (CVD) in a fluidized bed reactor. The substrate, for example finely divided mica, is fluidized in a stream of an inert carrier gas. The reagents required to form the oxide layers are supplied via the inert gas stream or further inert gas inlets. Owing to the large density difference between mica/pigment and carrier gas, however, an essential problem of this process is a uniform distribution of the solid particles and hence a uniform coating. Disadvantages of this invention are accordingly the technically very complicated and cost-intensive production process and the frequently immense difficulty of reproducing the pigments in the desired product quality.

EP 0 768 343 A2 discloses goniochromatic luster pigments comprising a silicon-containing coating and based on multiply-coated platelet-shaped metallic substrates.

Prior art multilayer pigments all possess insufficient color strength and comparatively poor hiding power. In addition, some of the pigments are very difficult to produce or reproduce.

SUMMARY OF THE INVENTION

It is a feature of the present invention to provide hiding gold and reddish orange interference pigments of high color strength which have advantageous application properties and are simple to produce.

Surprisingly, there have now been found gold and reddish orange pigments based on multiply-coated platelet-shaped substrates which contain a certain arrangement of optically functional layers, whereby particular visual effects are obtained.

The strong interference pigments of the invention are notable for their extremely high color strength or chroma C, their very high hiding power and a very pronounced luster featuring a glitter effect. Unlike gold-colored pearl luster pigments as disclosed in EP 0 211 351 B1, for example, the gold-colored interference pigments of the invention possess significantly higher color strength and a higher hiding power. The gold pigments of the invention are equivalent to existing metal bronzes—superior with regard to luster and color strength—in intaglio printing on textiles in particular.

Unlike goniochromatic pigments, the pigments of the invention provide a color effect which has little if any angle dependence.

The present invention accordingly provides a strong interference pigment based on multiply-coated platelet-shaped substrates, comprising at least one layer sequence of (A) a high refractive index coating comprising a mixture of $TiO_2$ and $Fe_2O_3$ in a ratio of about 10:1 to about 1:3 and optionally one or more metal oxides in amounts of ≤ about 20% by weight based on the layer (A), (B) a colorless coating having a refractive index n ≤ about 1.8, and optionally (C) an outer protective layer.

The invention further provides for the use of the pigments of the invention in paints, coatings, printing inks, plastics, ceramic materials, glasses, cosmetic formulations, for laser marking paper and plastics, especially in printing inks. The pigments of the invention are further useful for producing pigment preparations and also for producing dry products, for example granules, chips, pellets, briquettes, etc. The dry products are particularly useful for coatings and printing inks.

Useful base substrates for the multilayer pigments of the invention are opaque platelet-shaped substrates and transparent platelet-shaped substrates. Preferred substrates are sheet-silicates and also platelet-shaped materials with metal oxides. Of particular usefulness are natural and synthetic micas, talc, kaolin, platelet-shaped iron or aluminium oxides, glass, $SiO_2$, $TiO_2$ or synthetic ceramic platelets, synthetic carrier-free platelets, liquid crystal polymers (LCPs), holographic pigments, BiOCl, metal platelets, for example aluminium platelets, aluminium bronzes, brass bronzes, zinc bronzes, titanium bronzes or other comparable materials.

The size of the base substrates is not critical per se and can be adapted to the particular end use. In general, the platelet-shaped substrates are between about 0.1 and about 5 µm, especially between about 0.2 and about 4.5 µm, in thickness. In the other two dimensions they usually extend between about 1 and about 250 µm, preferably between about 2 and about 200 µm, especially between about 5 and about 60 µm.

The thickness on the base substrate of the individual layers having a high refractive index (pseudobrookite, for example) and a low refractive index is essential for the optical properties of the pigment. To obtain a pigment providing intensive interference colors, the thicknesses of the individual layers have to be accurately adjusted with respect to one another.

If n is the refractive index of a thin layer and d its thickness, the interference color of this layer is determined by the product n•d (n•d=optical thickness). The colors of such a film which are produced in the reflected light of light of normal incidence result from an amplification of the light of the wavelength $$\lambda = \frac{4}{2N-1} \cdot n \cdot d$$

and through weakening of the light of the wavelength $$\lambda = \frac{2}{N} \cdot n \cdot d$$

where N is a positive integer.

The variation in color resulting with increasing film thickness is the result of interference causing some wavelengths of the light to be amplified or attenuated. If a plurality of layers in a multilayer pigment have the same optical thickness, the color of the reflected light will increase in intensity as the number of layers increases. But, given a suitable choice with regard to layer thicknesses, very attractive interference pigments can also be obtained with layers having different optical thicknesses. The thickness of any one metal oxide layer—independent of the refractive index—is generally within the range from about 10 to about 1000 nm, preferably within the range from about 15 to about 800 nm, especially within the range about 20—about 600 nm, depending on the intended application.

The interference pigments of the invention include an alternating arrangement of a high refractive index coating (A), comprising a mixture of $TiO_2$ and $FeO_3$, preferably pseudobrookite of the formula $Fe_2TiO_5$, in combination with a colorless low refractive index coating (B). The pigments may include a plurality of, identical or different, combinations of layer packets, but the substrate is preferably coated with just one layer packet (A)+(B) and optionally (C). To intensify the color strength, the pigment of the invention can include up to 4 layer packets, in which case the thickness of all layers on the substrate should not exceed 3 $\mu$m, however. Preferably, an odd number of layers are applied to the platelet-shaped substrate with a high refractive index layer both in the innermost and the outermost position. Particular preference is given to a construction of three optical interference layers in the order (A) (B) (A) and optionally (C).

The high refractive index layer (A) has a refractive index $n \gtrsim$ about 2.0, preferably $n \gtrsim$ about 2.1, and is a mixture of $TiO_2$ and $Fe_2O_3$ in a mixing ratio of about 10:1 to about 1:3, in particular about 1:3 to about 1:2.5. The layer (A) is preferably pseudobrookite, which has a high color strength. The thickness of the layer (A) is about 10—about 550 nm, preferably about 15—about 400 nm, especially about 20—about 350 nm.

To increase the color strength of the layer (A), it is frequently advisable to admix the $TiO_2/Fe_2O_3$ mixture with one or more metal oxides, for example $Al_2O_3$, $Ce_2O_3$, $B_2O_3$, $ZrO_2$, $SnO_2$. The weight % age fraction in the layer (A) of metal oxides other than the $Fe_2O_3/TiO_2$ mixture should not be more than about 20% by weight, preferably not more than about 10% by weight.

Colorless low refractive index materials useful as the coating (B) are preferably metal oxides or the corresponding oxyhydrates, for example $SiO_2$, $Al_2O_3$, $AlO(OH)$, $B_2O_3$, $MgF_2$, $MgSiO_3$ or a mixture thereof. The thickness of the layer (B) is about 10—about 1000 nm, preferably about 20—about 800 nm, especially about 30—about 600 nm. The colorless coating has a refractive index $n \lesssim$ about 1.8, and preferably, the colorless coating has a refractive index of about $1.3 \lesssim n \lesssim$ about 1.8. The term "colorless" as used herein means materials that do not have a selective absorbtion in the visible spectral region between about 380 nm and about 780 nm.

Coating the substrates with a high refractive index pseudobrookite layer, a low refractive index layer (B) and a high refractive index layer (A) provides interference pigments whose color, luster and hiding power may be varied within wide limits.

The pigments of the invention are easy to produce by generating a plurality of high and low refractive index interference layers having an accurately defined thickness and a smooth surface on the finely divided platelet-shaped substrates.

The metal oxide layers are preferably applied wet-chemically, for example by using the wet-chemical coating processes developed for producing pearl luster pigments; such processes are described for example in DE 14 67 468, DE 19 59 988, DE 20 09 566, DE 22 14 545, DE 22 15 191, DE 22 44 298, DE 23 13 331, DE 25 22 572, DE 31 37 808, DE 31 37 809, DE 31 51 343, DE 31 51 354, DE 31 51 355, DE 32 11 602, DE 32 35 017 or else in further patent documents and other publications.

In wet coating, the substrate particles are suspended in water and admixed with one or more hydrolyzable metal salts at a suitable hydrolysis pH, chosen so that the metal oxides or oxyhydrates are directly precipitated onto the platelets without occurrence of coprecipitations. The pH is customarily kept constant by simultaneous metered addition of a base and/or acid. The pigments are then separated off, washed and dried and optionally calcined, in which case the calcination temperature may be optimized with regard to the respective coating present. In general, the calcination temperatures are between 250 and 1000° C., preferably between 350 and 900° C. If desired, the pigments can be separated off, dried and optionally calcined after application of individual coatings and then resuspended to precipitate further layers.

Furthermore, the coating may also take place in a fluidized bed reactor by gas phase coating, in which case, for example, the processes proposed in EP 0 045 851 and EP 0 106 235 for producing pearl luster pigments can be employed with appropriate changes. The hue of the pigments can be varied within wide limits by varying the coating rates and the resulting layer thicknesses. Beyond purely quantitative means, the fine adjustment for certain hues can be achieved by approaching the desired color under visual or instrumental control.

To increase the light, water and weathering stability, it is frequently advisable, depending on the end use, to subject the ready-produced pigment to an aftercoating or aftertreatment. Useful aftercoatings or aftertreatments include for example the processes described in DE-C-22 15 191, DE-A-31 51 354, DE-A-32 35 017 or DE-A-33 34 598. This aftercoating (layer C) further enhances the chemical stability or facilitates the handling of the pigment, especially its incorporation into different media, and may range in thickness from about 1 nm to about 100 nm.

The pigments of the invention are compatible with a multiplicity of color systems, preferably in the area of coatings, paints and printing inks. To produce printing inks, there are a multiplicity of suitable binders, especially water-soluble grades as marketed for example by the companies BASF, Marabu, Pröll, Sericol, Hartmann, Gebr. Schmidt, Sicpa, Aarberg, Siegberg, GSB-Wahl, Follmann, Ruco or Coates Screen INKS GmbH. The printing inks can be waterborne or solventborne. Furthermore, the pigments are also useful for the laser marking of paper and plastics and also for applications in the agricultural sector, for example for greenhouse film.

The invention further provides for the use of the pigments in formulations such as paints, printing inks, coatings, plastics, ceramic materials, glasses, cosmetics, for laser marking of paper and plastics, for producing pigment preparations and dry products, for example pellets, chips, granules, briquettes.

It will be readily understood that, for the various end uses, the multilayer pigments may also be used advantageously blended with organic dyes, organic pigments or other pigments, for example transparent and hiding white, color and black pigments and also with platelet-shaped iron oxides, organic pigments, holographic pigments, LCPs (liquid crystal polymers), and conventional transparent, colored and black luster pigments based on metal oxide coated mica and $SiO_2$ platelets, etc. The multilayer pigments can be blended with commercially available pigments and fillers in any desired ratio.

The pigments of the invention are further useful for producing flowable pigment preparations and dry products, especially for printing inks and coatings, preferably automotive coatings, comprising pigments of the invention, binders and optionally one or more additives. Possible binders used in pigment preparations may be based on cellulose, polyacrylate, polymethacrylate, alkyd, polyester, polyphenol, urea, melamine, polyterpene, polyvinyl, polyvinyl chloride, polyvinyl pyrrolidone resins, polystyrenes, polyolefins, indene-coumarone, hydrocarbon, ketone, aldehyde, aromatic-formaldehyde resins, carbamic acid, sulfonamide, epoxy resins, polyurethanes, and/or natural oils or derivatives of these substances.

The Examples hereinbelow will now describe the invention more particularly without, however, limiting it.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding German Application No. 199 15 153.9, filed Feb. 15, 1999 is hereby incorporated by reference.

EXAMPLES

Example 1

100 g of mica of particle size 10–60 µm in 2 l of demineralized water are heated up to 75° C. On attainment of this temperature, a solution of 130.5 g of $FeCl_3 \times 6\ H_2O$, 46.5 g of $TiCl_4$ and 11.6 g of $AlCl_3 \times 6\ H_2O$ in 84.3 g of demineralized water is gradually metered in with vigorous stirring. The pH is kept constant at pH 2.6 using 32% NaOH solution. After this solution has been added, the mixture is stirred for about 15 minutes. The pH is then raised to pH=7.5 using 32% NaOH solution, and 431 g of sodium waterglass solution (13.5% of $SiO_2$) are gradually metered in at that pH. Thereafter, the pH is lowered to 2.6 using 10% hydrochloric acid and a solution of 130.5 g of $FeCl_3 \times 6\ H_2O$, 46.5 g of $TiCl_4$ and 11.6 g of $AlCl_3 \times 6\ H_2O$ in 84.3 g of demineralized water is then gradually metered in. The pH is kept constant at pH=2.6 using 32% NaOH solution. After this solution has been added, the mixture is stirred for about 15 minutes. The pH is then raised to pH=5.0 using 32% NaOH solution and the mixture is stirred for a further 15 minutes.

The pigment is filtered off, washed with demineralized water and dried at 110° C. for 16 h. The pigment is finally calcined at 850° C. for 30 minutes. This affords a slightly reddish gold pigment having an intensive color, high hiding power and a pronounced luster.

Example 2

100 g of mica of particle size 10–60 µm in 2 l of demineralized water are heated up to 75° C. On attainment of this temperature, a solution of 121.5 g of $FeCl_3 \times 6\ H_2O$, 43.3 g of $TiCl_4$ and 10.6 g of $AlCl_3 \times 6\ H_2O$ in 77.0 g of demineralized water is gradually metered in with vigorous stirring. The pH is raised to pH=7.5 using 32% NaOH solution, and 394 g of sodium waterglass solution (13.5% of $SiO_2$) are gradually metered in at that pH. Thereafter, the pH is lowered to 2.6 using 10% hydrochloric acid. This mixture is stirred for 15 min and then a solution of 135.0 g of $FeCl_3 \times 6\ H_2O$, 51.7 g of $TiCl_4$ and 11.0 g of $AlCl_3 \times 6\ H_2O$ in 87.2 g of demineralized water is then gradually metered in. The pH is kept constant at pH=2.6 using 32% NaOH solution. After this solution has been added, the mixture is stirred for about 15 minutes. The pH is then raised to pH=5.0 using 32% NaOH solution and the mixture is stirred for a further 15 minutes. The pigment is filtered off, washed with demineralized water and dried at 110° C. for 16 h.

The pigment is finally calcined at 850° C. for 30 minutes. This affords a slightly greenish gold pigment having an intensive color, high hiding power and a pronounced luster.

Colorimetric data compared with a pearl luster gold pigment and a gold bronze pigment conforming to the prior art (Hunter Lab values measured against black background with gloss 22.5°/22.5°):

|  | L | a | b | h | C | Hiding power |
|---|---|---|---|---|---|---|
| gold-colored pearl luster pigment Iriodin ® 306 ($TiO_2/Fe_2O_3$ mica pigment of particle size 10–60 µm from Merck KGaA) | 72.9 | 0.6 | 29.7 | 88.8 | 29.7 | 40.8 |
| gold interference pigment Ex.1 | 76.2 | 2.5 | 39.8 | 86.5 | 39.9 | 57.5 |
| gold interference pigment Ex.2 | 83.4 | -4.8 | 41.0 | 96.7 | 41.3 | 72.0 |
| metal gold bronze (fr. Eckart, Reichbleich-gold) | 78.2 | 0.9 | 22.7 | 87.7 | 22.7 | 51.8 |

The calorimetric data, especially with regard to the b value and the chroma C*, clearly show the advantages of the interference pigments of the invention over comparative pigments.

Example 3

100 g of mica of particle size 10–60 µm in demineralized water are heated up to 75° C. On attainment of this temperature, a solution of 188.0 g of $FeCl_3 \times 6\ H_2O$, 77.0 g of $TiCl_4$ and 16.7 g of $AlCl_3 \times 6\ H_2O$ in 121.4 g of demineralized water is metered in with vigorous stirring. The pH is kept constant at pH=2.6 using 32% NaOH solution. After this solution has been added, the mixture is stirred for about 15 minutes. The pH is then raised to pH=7.5 using 32% NaOH solution, and 484.6 g of sodium waterglass solution (13.5% of $SiO_2$) are metered in at that pH. Thereafter, the pH is lowered to 2.6 using 10% hydrochloric acid, the mixture is stirred for 15 minutes and a solution of 188.0 g of $FeCl_3 \times 6\ H_2O$, 77.0 g of $TiCl_4$ and 16.7 g of $AlCl_3 \times 6\ H_2O$ in 121.4 g of demineralized water is then metered in at a rate of 1 ml/min. The pH is kept constant at pH=2.6 using 32% NaOH solution. After this solution has been added, the mixture is stirred for about 15 minutes. The pH is then raised to pH=5.0 using 32% NaOH solution and the mixture is stirred for a further 15 minutes. The pigment is filtered, washed with water and dried at 110° C. for 16 h. The pigment is finally calcined at 850° C. for 30 minutes. This affords a reddish orange luster pigment having an intensive color, high hiding power and a pronounced luster.

Example 4

200 g of gold pigment of Example 1 in 1.8 l of demineralized water are heated to 75° C. with stirring. After 75° C. has been reached, the pH is adjusted to 2.5 using hydrochloric acid (5% HCl) and a solution of 11.5 g of $ZrOCl_2 \times 8 H_2O$, 11.4 g of $NaH_2PO_4 \times H_2O$ and 10 ml of hydrochloric acid (37% HCl) in 856 ml of demineralized water is metered in while the pH is kept constant using aqueous sodium hydroxide solution (5 % NaOH). After a stirring time of 30 minutes, the pH is raised to 9.2 using aqueous sodium hydroxide solution (5 % NaOH). Following a subsequent stirring time of 30 minutes, a solution of 4.1 g of Z6040 (organosiloxane from Dow Corning) in 200 ml of demineralized water is metered in and stirred in for 30 minutes. The product is filtered off, washed and dried at 140° C. for 16 h.

Use Examples

Example 5

Screen printing on textile

The printing ink comprising Helizarin MT, retarder (2%) and interference pigment of Example 1 (15%) is printed out on cotton on a Schenk flat bed screen printing machine (screen: T 43; squeegee: 70 Shore). The print possesses excellent luster coupled with high color intensity and high hiding power not only on black fabric but also on white fabric.

Example 6

Screen printing on paper

The printing ink consisting of MZ lacquer 093 (fr. Pröll) and pigment of Example 1 (15%) is printed up on an esc. Atma flat bed SDR machine. The print possesses excellent luster coupled with high color intensity and high hiding power not only on black paper but also on white paper.

Example 7

Intaglio printing on paper

The printing ink consisting of 70 g of GS 95 MB 011 TW (fr. Gebr. Schmidt), 30 g of 1-ethoxy-2-propanol and 30 g of gold pigment from Example 1 is printed up on a intaglio printing machine from Moser and a Saueressig apparatus. The print is notable for unusually pronounced luster, intensive color and high hiding power.

Example 8

Pigmentation of granular plastics
PE, PP and PS granules are each admixed with 1% of interference pigment from Example 1. The latter is drummed onto the granules for 2.5 minutes clockwise and 2.5 minutes anticlockwise.

a) Example for polyolefins:
  494 g of HDPE and HDPP
  1 g of adhesion promoter (blend for 2')
  5 g of interference pigment (blend for 2×2.5')
  500 g of blend
b) Example for polystyrene (PS):
  492.5 g of PS
  2.5 g of adhesion promoter (blend for 2')
  5.0 g of pigment (blend for 2×2.5')
  500 g of blend Processing These "externally pigmented" granules produced as described above are then processed on a standard injection moulding machine into small stepped plates.

|  | Black card 22.5°/22.5° | | | |
|---|---|---|---|---|
|  | L | a | b | C* |
| HDPE Iriodin ® 306 | 63.5 | 5.0 | 42.7 | 43.0 |
| HDPE Example 1 | 68.3 | 2.4 | 47.0 | 47.1 |
| Polystyrene Iriodin ® 306 | 66.0 | 3.5 | 46.5 | 46.6 |
| Polystyrene Example 1 | 71.1 | 0.8 | 51.6 | 51.6 |

Example 9

Automotive coating 1.20% of interference pigment of Example 1
0.30% of Hostaperngrün 8 G
0.30% of pigment grade carbon black FW 200
0.50% of Microtitan MT 500 HD
0.10% of Kronos 2310
P/B=0.21:1
Binder system: acrylate/melamine
Use level: 0.5–6%
preferred: 0.5–2%

|  | Black card 22.5°/22.5° | | | |
|---|---|---|---|---|
|  | L | a | b | C* |
| Coated card Iriodin ® 306 | 56.5 | −1.0 | 30.3 | 30.3 |
| Coated card Example 1 | 67.6 | −3.2 | 47.1 | 47.2 |
| Coated metal Iriodin ® 306 | 68.0 | 2.6 | 45.5 | 45.6 |
| Coated metal Example 4 | 75.6 | −1.4 | 54.2 | 54.2 |

The preceding examples can be repeated with similar success by substituting the generically or specifically described reactants and/or operating conditions of this invention for those used in the preceding examples.

What is claimed is:
1. A strong interference pigment comprising a multiply-coated platelet-shaped substrate, having at least one layer sequence of
  (A) a high refractive index coating comprising a mixture of $TiO_2$ and $Fe_2O_3$ in a weight ratio of about 10:1 to about 1:3 and optionally one or more metal oxides in amounts of ≤ about 20% by weight based on the layer (A),
  (B) a colorless coating having a refractive index n ≤ about 1.8, and optionally
  (C) an outer protective layer.

2. The interference pigment according to claim 1, wherein the platelet-shaped substrates are selected from natural or synthetic mica, glass, $Al_2O_3$, $SiO_2$ or $TiO_2$ platelets and platelet-shaped materials coated with metal oxides.

3. The interference pigment according to claim 1, wherein the layer (A) comprises pseudobrookite.

4. The interference pigment according to claim 1, wherein the layer (B) consists essentially of one or more metal oxides.

5. The interference pigment according to claim 1, wherein the layer (B) consists essentially of silicon dioxide, aluminum oxide, magnesium fluoride or mixtures thereof.

6. The interference pigment according to claim 1, wherein the layer (A) comprises $Al_2O_3$, $Ce_2O_3$ and/or $B_2O_3$ as further metal oxide.

7. The interference pigment according to of claim 1, wherein the interference pigment includes the layer sequence (A)+(B) up to four times.

8. The interference pigment according to claim 1, wherein the interference pigment includes just one layer sequence (A)+(B)+(A) and optionally (C).

9. The process for producing the interference pigment of claim 1, wherein the metal oxides are applied wet-chemically to the platelet-shaped substrate by hydrolytic decomposition of metal salts in an aqueous medium.

10. A paint, coating, printing ink, plastic, ceramic material, glass or cosmetic formulation, for laser marking of paper and plastics, for producing pigment preparations and dry products comprising the interference pigment according to claim 1.

11. Pigment preparations comprising one or more binders and one or more interference pigments according to claim 1.

12. Dry preparations such as pellets, chips, granules, briquettes comprising interference pigments according to claim 1.

13. The interference pigment according to claim 1, wherein the mixture of $TiO_2$ and $Fe_2O_3$ is in a ratio of about 1:3 to about 1:2.5.

14. The interference pigment according to claim 1, wherein the layer (A) has a thickness of about 10—about 550 nm.

15. The interference pigment according to claim 1, wherein the layer (B) has a thickness of about 10—about 1000 nm.

16. The interference pigment according to claim 1, wherein the substrate has a thickness of about 0.1 and about 5 μm.

17. The interference pigment according to claim 1, wherein the pigment has a gold color.

18. The interference pigment according to claim 1, wherein the pigment has a reddish orange color.

19. The interference pigment according to claim 1, wherein (C) is an aftercoating.

* * * * *